United States Patent
Kono et al.

(10) Patent No.: US 12,428,503 B2
(45) Date of Patent: Sep. 30, 2025

(54) METHOD FOR PRODUCING CATALYST FOR POLYMERIZATION OF OLEFIN AND CATALYST FOR POLYMERIZATION OF OLEFIN

(71) Applicant: TOHO TITANIUM CO., LTD., Chigasaki (JP)

(72) Inventors: Hiroyuki Kono, Chigasaki (JP); Takaharu Sakemi, Chigasaki (JP); Toshiya Uozumi, Chigasaki (JP); Keisuke Goto, Chigasaki (JP)

(73) Assignee: TOHO TITANIUM CO., LTD., Chigasaki (JP)

( * ) Notice: Subject to any disclaimer, the term of this patent is extended or adjusted under 35 U.S.C. 154(b) by 513 days.

(21) Appl. No.: 17/927,428

(22) PCT Filed: Mar. 15, 2021

(86) PCT No.: PCT/JP2021/010322
§ 371 (c)(1),
(2) Date: Nov. 23, 2022

(87) PCT Pub. No.: WO2021/240956
PCT Pub. Date: Dec. 2, 2021

(65) Prior Publication Data
US 2023/0220126 A1  Jul. 13, 2023

(30) Foreign Application Priority Data
May 27, 2020  (JP) .................. 2020-092540

(51) Int. Cl.
C08F 4/65 (2006.01)
C08F 4/654 (2006.01)

(52) U.S. Cl.
CPC .................. *C08F 4/654* (2013.01)

(58) Field of Classification Search
CPC ......... C08F 4/654; C08F 10/00; C08F 110/06
See application file for complete search history.

(56) References Cited

U.S. PATENT DOCUMENTS

| 5,122,583 A | 6/1992 | Ewen et al. |
| 2004/0063571 A1 | 4/2004 | Kim et al. |
| 2014/0148562 A1 | 5/2014 | Kamimura et al. |
| 2018/0037716 A1 | 2/2018 | Braun et al. |
| 2018/0371120 A1* | 12/2018 | Hosaka ................... C08F 10/06 |

FOREIGN PATENT DOCUMENTS

| EP | 2535372 A1 | 12/2012 | |
| JP | S57-63310 A | 4/1982 | |
| JP | S62-50308 A | 3/1987 | |
| JP | H05-194637 A | 8/1993 | |
| JP | H07-173213 A | 7/1995 | |
| JP | H10-36430 A | 2/1998 | |
| JP | 2009-249506 A | 10/2009 | |
| TW | 201806981 A * | 3/2018 | .............. C08F 4/654 |
| WO | 2015/012963 A1 | 1/2015 | |

OTHER PUBLICATIONS

Machine translation of TW201806981. (Year: 2018).*
Extended (Supplementary) European Search Report dated May 16, 2024, issued in counterpart Application No. 21814262.8. (9 pages).
Office Action dated Sep. 19, 2023, issued in counterpart CN Application No. 202180037225.2, with English Translation. (14 pages).
International Search Report dated May 18, 2021, issued in counterpart International application No. PCT/JP2021/010322, with English translation. (5 pages).

* cited by examiner

*Primary Examiner* — Brian A McCaig
(74) *Attorney, Agent, or Firm* — WHDA, LLP

(57) ABSTRACT

A method is disclosed for producing a catalyst, which suppresses a decrease in polymerization activity due to early deactivation of the active site after the catalyst has been formed, exhibits excellent catalyst activity at the time of polymerization of olefins, and can produce polymers of olefins, which are excellent in stereoregularity. The method for producing a catalyst includes contacting a solid catalyst component (A) containing magnesium, titanium, halogen and an internal electron-donating compound, and a specific organoaluminum compound (B) represented by the general formula (I), with each other, wherein at least one selected from the solid catalyst component (A) and the organoaluminum compound (B) is previously subjected to contact treatment with a hydrocarbon compound having one or more vinyl groups, in an organic solvent containing 30% by mass or more of one or more compounds selected from saturated aliphatic hydrocarbon compounds having 20 or more carbon atoms.

11 Claims, No Drawings

METHOD FOR PRODUCING CATALYST FOR POLYMERIZATION OF OLEFIN AND CATALYST FOR POLYMERIZATION OF OLEFIN

TECHNICAL FIELD

The present invention relates to a precursor composition of a catalyst for polymerization of an olefin, a method for producing a catalyst for polymerization of an olefin, and a catalyst for polymerization of an olefin.

BACKGROUND ART

Conventionally, as a catalyst for polymerization of an olefin, a catalyst is widely known that is obtained by contacting a solid catalyst component containing a catalyst component of a transition metal such as titanium and a catalyst component of a typical metal such as aluminum with each other (for example, see Patent Literature 1).

The polymerization activity of the catalyst for polymerization of an olefin has remarkably increased by the appearance of a supported type catalyst which uses a magnesium compound as a carrier, and further, by an addition of an electron donor such as an ester compound, it becomes possible to produce a polymer having high stereoregularity from an α-olefin having 3 or more carbon atoms.

For example, Patent Literature 2 describes a method for polymerizing propylene with the use of a solid titanium catalyst component that carries an electron-donating compound such as phthalic acid ester thereon, an organoaluminum compound as a cocatalyst component, and an organosilicon compound having at least one Si—O—C bond; and in many literatures including the above Patent Literature, a method is proposed which uses a phthalic acid ester as the electron-donating compound and obtains a high stereoregular polymer in high yield.

However, di-n-butyl phthalate and benzylbutyl phthalate, which are one type of phthalic acid esters, are identified as Substance of Very High Concern (SVHC) in European regulation concerning the Registration, Evaluation, Authorization and Restriction of Chemicals (REACH); and from the viewpoint of reducing an environmental load, there is an increasing demand for conversion into a catalyst system that does not use a SVHC substance.

As an electron-donating compound which is not subject to SVHC regulation, there are known a solid catalyst component that uses a succinic acid ester, a maleic acid ester, a malonic acid ester, a diether or the like.

CITATION LIST

Patent Literature

[Patent Literature 1] WO 2015/012963
[Patent Literature 2] Japanese Patent Laid-Open No. 57-63310

SUMMARY OF INVENTION

Technical Problem

However, it is known that a solid catalyst component that uses a compound which is not subject to SVHC regulation as the electron-donating compound resists exhibiting the same performance as a solid catalyst component that uses a phthalic acid ester. In particular, in a polymerization facility in which there is a process in which a solid catalyst component, an organoaluminum compound, and, if necessary, an external electron-donating compound are contacted with each other in an inert gas atmosphere such as a nitrogen atmosphere, a solid catalyst component that uses the electron-donating compound which is not a substance subject to SVHC regulation tends to remarkably lower the activity. Under such circumstances, further improvement has been required for a solid catalyst component that uses the electron-donating compound which is not subject to the SVHC regulation.

As a result of investigation by the present inventors on this point, it has been found that in the above process, when the solid catalyst component, the organoaluminum compound and, if necessary, the external electron-donating compound are contacted with each other, an excessive reaction results in progressing. In this case, there is a concern that the internal electron-donating compound is desorbed from the solid catalyst component, an exchange reaction occurs between the internal electron-donating compound and an organosilicon compound, or excessive activation of the solid catalyst component occurs due to an organoaluminum compound.

Because of this, it is considered that even if olefins are intended to be polymerized with the use of a catalyst for polymerization in an inert gas atmosphere such as a nitrogen atmosphere, a polyolefin is not formed on the surface of the catalyst for polymerization, and deactivation of active sites of the catalyst proceeds due to the excessive reaction. In particular, it has been found that when a so-called non-phthalate type of internal electron-donating compound is employed which does not have a phthalic acid ester structure in place of an internal electron-donating compound which has an aromatic ring structure directly bonded to a residue of a carboxylic acid ester, in other words, a so-called phthalic acid ester structure, the influence of organoaluminum tends to be strongly exhibited.

In addition, it has been found that the catalyst activity and stereoregularity of the catalyst for polymerization of an olefin tend to decrease as the above deactivation of the active sites of the catalyst progresses.

Under such circumstances, an object of the present invention is to provide a precursor composition of a catalyst for polymerization of an olefin, which suppresses a decrease in polymerization activity caused by early deactivation of an active site after the catalyst has been formed, and exhibits excellent catalyst activity during polymerization of olefins, and can produce polymers of olefins excellent in stereoregularity; a method for producing a catalyst for polymerization of an olefin; and the catalyst for polymerization of an olefin.

Solution to Problem

In order to solve the above technical problems, the present inventors have conducted extensive investigations, and as a result, have found that the above technical problem can be solved by a method of producing a catalyst for polymerization of an olefin by contacting a solid catalyst component (A) containing magnesium, titanium, halogen and an internal electron-donating compound, and an organoaluminum compound (B) with each other, wherein at least one selected from the solid catalyst component (A) and the organoaluminum compound (B) is previously subjected to contact treatment with a hydrocarbon compound having one or more vinyl groups, in an organic solvent containing 30% by mass or more of one or more compounds selected from saturated aliphatic hydrocarbon compounds having 20 or more carbon atoms; and have reached the completion of the present invention based on the present finding.

Specifically, the present invention provides:

(1) a method for producing a catalyst for polymerization of an olefin, including contacting a solid catalyst component (A) containing magnesium, titanium, halogen and an internal electron-donating compound, and an organoaluminum compound (B) represented by the following general formula (I):

$$R^1_p AlQ_{3-p} \quad (I),$$

wherein $R^1$ represents an alkyl group having 1 to 6 carbon atoms, Q represents a hydrogen atom or a halogen atom, and p represents a real number satisfying $0<p\leq3$, with each other, wherein at least one selected from the solid catalyst component (A) and the organoaluminum compound (B) is previously subjected to contact treatment with a hydrocarbon compound having one or more vinyl groups, in an organic solvent containing 30% by mass or more of one or more compounds selected from saturated aliphatic hydrocarbon compounds having 20 or more carbon atoms;

(2) the method for producing a catalyst for polymerization of an olefin according to the above (1), wherein the solid catalyst component (A) is previously subjected to the contact treatment with a hydrocarbon compound having one or more vinyl groups, in an organic solvent containing 30% by mass or more of one or more compounds selected from saturated aliphatic hydrocarbon compounds having 20 or more carbon atoms;

(3) the method for producing a catalyst for polymerization of an olefin according to the above (2), including contacting a precursor composition (α) of the catalyst for polymerization of an olefin, the precursor composition (α) containing: the solid catalyst component (A) containing magnesium, titanium, halogen and the internal electron-donating compound; a hydrocarbon compound having one or more vinyl groups; and an organic solvent containing 30% by mass or more of one or more compounds selected from saturated aliphatic hydrocarbon compounds having 20 or more carbon atoms, and the organoaluminum compound (B) represented by the following general formula (I):

$$R^1_p AlQ_{3-p} \quad (I),$$

wherein $R^1$ represents an alkyl group having 1 to 6 carbon atoms, Q represents a hydrogen atom or a halogen atom, and p represents a real number satisfying $0<p\leq3$, with each other;

(4) the method for producing a catalyst for polymerization of an olefin according to the above (1), wherein the organoaluminum compound (B) is previously subjected to the contact treatment with a hydrocarbon compound having one or more vinyl groups, in an organic solvent containing 30% by mass or more of one or more compounds selected from saturated aliphatic hydrocarbon compounds having 20 or more carbon atoms;

(5) the method for producing a catalyst for polymerization of an olefin according to the above (4), including contacting a precursor composition (β) of the catalyst for polymerization of an olefin, the precursor composition (β) containing: the organoaluminum compound (B) represented by the following general formula (I):

$$R^1_p AlQ_{3-p} \quad (I),$$

wherein $R^1$ represents an alkyl group having 1 to 6 carbon atoms, Q represents a hydrogen atom or a halogen atom, and p represents a real number satisfying $0<p\leq3$; a hydrocarbon compound having one or more vinyl groups; and an organic solvent containing 30% by mass or more of one or more compounds selected from saturated aliphatic hydrocarbon compounds having 20 or more carbon atoms, and the solid catalyst component (A) containing magnesium, titanium, halogen and an internal electron-donating compound, with each other;

(6) the method for producing a catalyst for polymerization of an olefin according to the above (1), wherein the amount of at least one selected from the solid catalyst component (A) and the organoaluminum compound (B) to be previously subjected to the contact treatment with the hydrocarbon compound having one or more vinyl groups is 1 mol or more per 1 mol of titanium constituting the solid catalyst component (A) that is subjected to the production of the catalyst for polymerization of an olefin;

(7) the method for producing a catalyst for polymerization of an olefin according to the above (1), wherein the hydrocarbon compound having one or more vinyl groups is one or more compounds selected from ethylene, propylene, 1-butene, 1-pentene, 3-methyl-1-butene, 1-hexene, 4-methyl-1-pentene, 3-methyl-1-pentene, 1,4-hexadiene, 1,5-hexadiene, 1,6-octadiene, 1,7-octadiene, 1-heptene, 1-octene, vinylcyclohexane, and vinylcyclohexene;

(8) the method for producing a catalyst for polymerization of an olefin according to the above (1), wherein the organic solvent is a mineral oil;

(9) A catalyst for polymerization of an olefin includes a solid catalyst component (A) containing magnesium, titanium, halogen and an internal electron-donating compound, an organoaluminum compound (B) represented by the following general formula (I):

$$R^1_p AlQ_{3-p} \quad (I),$$

wherein $R^1$ represents an alkyl group having 1 to 6 carbon atoms, Q represents a hydrogen atom or a halogen atom, and p represents a real number satisfying $0<p\leq3$, a hydrocarbon compound having one or more vinyl groups, and an organic solvent containing 30% by mass or more of one or more compounds selected from saturated aliphatic hydrocarbon compounds having 20 or more carbon atoms, wherein the hydrocarbon compound having one or more vinyl groups is contained in an amount of at least 0.1% by mass with respect to a total weight of titanium contained in the solid catalyst component (A);

(10) the catalyst for polymerization of an olefin according to the above (9), wherein the hydrocarbon compound having one or more vinyl groups is one or more compounds selected from ethylene, propylene, 1-butene, 1-pentene, 3-methyl-1-butene, 1-hexene, 4-methyl-1-pentene, 3-methyl-1-pentene, 1,4-hexadiene, 1,5-hexadiene, 1,6-octadiene, 1,7-octadiene, 1-heptene, 1-octene, vinylcyclohexane, and vinylcyclohexene; and

(11) the catalyst for polymerization of an olefin according to the above (9), wherein the organic solvent is a mineral oil.

Advantageous Effects of Invention

According to the present invention, at least one selected from the solid catalyst component (A) and the organoaluminum compound (B) is previously subjected to contact treatment with a hydrocarbon compound having one or more vinyl groups, and thereby, a protective film of polyolefin is easily formed on the surface of the solid catalyst component. It is considered that as a result, an excessive activation reaction by the organoaluminum compound onto the active site of titanium in the solid catalyst component can be suppressed, and the catalyst for polymerization of an olefin can be subjected to a polymerization reaction in a stable state while suppressing deactivation of the catalyst.

For this reason, the present invention can provide: a method for producing a catalyst for polymerization of an olefin, which suppresses a decrease in polymerization activity due to early deactivation of the active site after the catalyst has been formed, exhibits excellent catalyst activity at the time of polymerization of olefins, and can produce polymers of olefins, which are excellent in stereoregularity; and the catalyst for polymerization of an olefin.

DESCRIPTION OF EMBODIMENTS

<Method for Producing Catalyst for Polymerization of Olefin>

A method for producing a catalyst for polymerization of an olefin according to the present invention includes contacting a solid catalyst component (A) containing magnesium, titanium, halogen and an internal electron-donating compound, and an organoaluminum compound (B) represented by the following general formula (I):

$$R^1_p AlQ_{3-p} \qquad (I),$$

wherein $R^1$ represents an alkyl group having 1 to 6 carbon atoms, Q represents a hydrogen atom or a halogen atom, and p represents a real number satisfying $0 < p \le 3$, with each other, wherein at least one selected from the solid catalyst component (A) and the organoaluminum compound (B) is previously subjected to contact treatment with a hydrocarbon compound having one or more vinyl groups, in an organic solvent containing 30% by mass or more of one or more compounds selected from saturated aliphatic hydrocarbon compounds having 20 or more carbon atoms.

In the method for producing a catalyst for polymerization of an olefin according to the present invention, the solid catalyst component (A) suitably contains magnesium, titanium and halogen, and also an internal electron-donating compound having one or more groups selected from an ester group, an ether group, and a carbonate group; and more suitably contains magnesium, titanium and halogen, and also an internal electron-donating compound which has one or more groups selected from an ester group, an ether group and a carbonate group, and does not have an aromatic ring structure directly bonded to a residue of a carboxylic acid ester.

Examples of such solid catalyst components (A) include: compounds obtained by contacting a magnesium compound (a), a titanium halogen compound (b), and an internal electron-donating compound (c) having one or more groups selected from an ester group, an ether group and a carbonate group, with each other; and compounds obtained by contacting a magnesium compound (a), a titanium halogen compound (b), and an internal electron-donating compound (c) which has one or more groups selected from an ester group, an ether group and a carbonate group, and does not have an aromatic ring structure directly bonded to a residue of a carboxylic acid ester, with each other.

Examples of the above magnesium compound (a) include one or more compounds selected from a magnesium dihalide, a dialkyl magnesium, an alkyl magnesium halide, a dialkoxy magnesium, diaryloxy magnesium, an alkoxy magnesium halide, a fatty acid magnesium or the like.

Among these magnesium compounds, the magnesium dihalide, a mixture of a magnesium dihalide and a dialkoxy magnesium, and the dialkoxy magnesium are preferable, and the dialkoxy magnesium is particularly preferable.

Specific examples of the dialkoxy magnesium include one or more compounds selected from dimethoxy magnesium, diethoxy magnesium, dipropoxy magnesium, dibutoxy magnesium, ethoxymethoxy magnesium, ethoxypropoxy magnesium, butoxyethoxy magnesium and the like; and among these compounds, the diethoxy magnesium is particularly preferable.

The above dialkoxy magnesium may be a commercially available product, or may be a compound obtained by reacting metal magnesium with an alcohol in the presence of a halogen-containing organic metal or the like.

In addition, the above dialkoxy magnesium may be granular or powdery, and the shape thereof may be amorphous or spherical. For example, when a spherical dialkoxy magnesium is used, a polymer powder tends to be easily obtained which has a better particle shape and a narrow particle size distribution; and then, a handling operability of the polymer powder is improved which is produced by polymerization (produced polymer powder), and such problems are easily solved as the clogging of a filter in a separation apparatus of a polymer, which originates in a fine powder contained in the produced polymer powder.

For information, the spherical dialkoxy magnesium does not necessarily have a true spherical shape, and may have an elliptical shape or a potato shape.

The above dialkoxy magnesium may be used singly or in combination of two or more thereof.

Furthermore, the above dialkoxy magnesium preferably has an average particle size (average particle size D50) of 1 to 200 μm, and is more preferably 5 to 150 μm. Here, average D50 means a particle size of 50% at a cumulative particle size in a volume-cumulative particle size distribution, at the time when having been measured with the use of a laser light scattering/diffraction particle size analyzer.

When the above dialkoxy magnesium is spherical, the average particle size thereof is preferably 1 to 100 μm, is more preferably 5 to 80 μm, and is further preferably 10 to 70 μm.

In addition, for the particle size distribution of the above dialkoxy magnesium, it is preferred that the dialkoxy magnesium should have a narrow particle size distribution with fewer numbers of a fine powder and a coarse powder.

Specifically, the dialkoxy magnesium preferably contains 20% or less, more preferably 10% or less, of particles (fine powder) having particle sizes of 5 μm or smaller, when having been measured with the use of a laser light scattering/diffraction particle size analyzer. On the other hand, the dialkoxy magnesium preferably contains 10% or less, more preferably 5% or less, of particles (coarse powder) having particle sizes of 100 μm or larger, when having been measured with the use of the laser light scattering/diffraction particle size analyzer.

Furthermore, the dialkoxy magnesium has a particle size distribution represented by ln(D90/D10) of preferably 3 or less, and more preferably 2 or less.

In the present invention, the dialkoxy magnesium of which the above particle size distribution represented by ln (D90/D10) is the above predetermined value or smaller means a "dialkoxy magnesium having narrow particle size distribution".

Here, D90 means a particle size of 90% at a cumulative particle size in a volume-cumulative particle size distribution, at the time when measured with the use of a laser light scattering/diffraction particle size analyzer. In addition, D10 means a particle size of 10% at a cumulative particle size in a volume-cumulative particle size distribution, at the time when measured with the use of a laser light scattering/diffraction particle size analyzer.

A method for producing the spherical dialkoxy magnesium as in the above is illustrated in, for example, Japanese Patent Laid-Open No. 58-4132, Japanese Patent Laid-Open No. 62-51633, Japanese Patent Laid-Open No. 3-74341, Japanese Patent Laid-Open No. 4-368391, Japanese Patent Laid-Open No. 8-73388 and the like.

The above titanium halogen compound (b) is not particularly limited and is preferably one compound selected from the group of a titanium tetrahalide and an alkoxy titanium halide represented by the following general formula (II):

$$Ti(OR^2)_i X_{4-i} \quad (II)$$

wherein $R^2$ represents an alkyl group having 1 to 4 carbon atoms; X represents a halogen atom such as a chlorine atom, a bromine atom, or an iodine atom; and i is an integer of 0 to 3.

Specific examples of the titanium halogen compound (b) represented by the above general formula (II) include titanium tetrahalides such as titanium tetrachloride, titanium tetrabromide, and titanium tetraiodide. Examples of the alkoxy titanium halide include methoxy titanium trichloride, ethoxy titanium trichloride, propoxy titanium trichloride, n-butoxy titanium trichloride, dimethoxy titanium dichloride, diethoxy titanium dichloride, dipropoxy titanium dichloride, di-n-butoxy titanium dichloride, trimethoxy titanium chloride, triethoxy titanium chloride, tripropoxy titanium chloride, and tri-n-butoxy titanium chloride. Among these compounds, the titanium tetrahalide is preferable, and titanium tetrachloride is more preferable.

Any of the internal electron-donating compounds (c) is not particularly limited which are used as the electron-donating compound in the solid catalyst component (A). One of the compounds (c) has one or more groups selected from an ester group, an ether group and a carbonate group; and another one of the compounds (c) has one or more groups selected from an ester group, an ether group and a carbonate group, and does not have an aromatic ring structure directly bonded to a residue of a carboxylic acid ester.

The above internal electron-donating compound (c) that has one or more groups selected from the ester group, the ether group and the carbonate group and does not have an aromatic ring structure directly bonded to a residue of a carboxylic acid ester is used as a specific internal electron-donating compound that does not have the aromatic ring structure directly bonded to the residue of the carboxylic acid ester, in the present invention.

When the above internal electron-donating compound (c) is a compound having an ester group, a compound having 1 to 3 ester residues is preferable; and examples thereof include one or more compounds selected from monocarboxylic acid esters having one ester residue, dicarboxylic acid diesters having two ester residues, polycarboxylic acid polyesters having three or more ester residues, ether-carboxylic acid esters having one ester residue and one alkoxy group respectively, and diol esters.

Specific examples of the internal electron-donating compound (c) having an ester group include polyol esters and substituted phenylene aromatic diesters; and are preferably succinic acid diesters, malonic acid diesters, maleic acid diesters and cyclohexenecarboxylic acid diesters. Among the compounds, the malonic acid diesters, the maleic acid diesters and the cyclohexenecarboxylic acid diesters are particularly preferable.

Among the above compounds, preferable compounds include: monocarboxylic acid esters such as acetic acid ester, propionic acid ester, benzoic acid ester, p-toluyl acid ester, and anis acid ester; dicarboxylic acid diesters such as succinic acid diester, malonic acid diester, maleic acid diester, cyclohexene carboxylic acid diester, 2,3-dialkylsuccinic acid diester, benzylidene malonic acid diester, cyclohexane-1,2-dicarboxylic acid diester, 1-cyclohexene-1,2-dicarboxylic acid diester, 4-methylcyclohexane-1,2-dicarboxylic acid diester, 3-methylcyclohexane-1,2-dicarboxylic acid diester, 3,6-diphenylcyclohexane-1,2-dicarboxylic acid diester, and 3-methyl-6-n-propylcyclohexane-1,2-dicarboxylic acid diester; ether-carboxylic acid esters such as ethyl 3-ethoxy-2-isopropylpropionate, ethyl 3-ethoxy-2-isobutylpropionate, ethyl 3-ethoxy-2-t-butylpropionate, ethyl 3-ethoxy-2-t-pentylpropionate, ethyl 3-ethoxy-2-cyclohexylpropionate, and ethyl 3-ethoxy-2-cyclopentylpropionate; and diol esters such as 2,4-pentanediol dibenzoate, 3-methyl-2,4-pentanediol dibenzoate, 3-methyl-5-t-butyl-1,2-phenylenedibenzoate, and 3,5-diisopropyl-1,2-phenylenedibenzoate.

Among these compounds, particularly preferable compounds include one or more compounds selected from diethyl maleate, diethyl benzylidenemalonate, diethyl cyclohexane-1,2-dicarboxylic acid, di-n-propyl cyclohexane-1,2-dicarboxylic acid, di-n-butyl cyclohexane-1,2-dicarboxylic acid, ethyl 3-ethoxy-2-isopropylpropionate, ethyl 3-ethoxy-2-t-butylpropionate, ethyl 3-ethoxy-2-t-pentylpropionate, 2,4-pentanediol dibenzoate, 3-methyl-2,4-pentanediol dibenzoate, 3-methyl-5-t-butyl-1,2-phenylenedibenzoate, and 3,5-diisopropyl-1,2-phenylenedibenzoate.

When the above internal electron-donating compound (c) is a compound having an ether group, a preferable compound is a compound having one ether group, a compound having a fluorene structure, or a compound having a diether structure having 1 to 2 groups of an alkyl group or a cycloalkyl group each having 3 to 7 carbon atoms. Among these compounds, a 1,3-diether compound is more preferable that has a structure which has propane as a basic skeleton, and ether groups bonded to 1 and 3 positions thereof respectively (1,3-dialkoxypropane structure), and further may contain a desired substituent.

Specific examples of the internal electron-donating compound (c) having an ether group include one or more compounds selected from: monoethers such as methyl ether, ethyl ether, propyl ether, butyl ether, and amyl ether; and diethers such as diphenyl ether, 2,2-dialkyl-1,3-dialkoxypropane, 2,2-dicycloalkyl-1,3-dimethoxypropane, and 9,9-bis(methoxymethyl)fluorene. Among these compounds, ether carboxylic acid esters are preferable.

Among the above compounds, particularly preferable compounds are 2-isopropyl-2-isobutyl-1,3-dimethoxypropane, 2-isopropyl-2-isopentyl-1,3-dimethoxypropane, and 9,9-bis(methoxymethyl)fluorene.

When the above internal electron-donating compound (c) is a compound having a carbonate group, a compound having 1 to 3 carbonate groups is preferable. Specific examples of such compounds include a carbonate-ether compound having one carbonate group and one alkoxy group respectively, a carbonate-ester compound having one carbonate group and one ester residue respectively, a compound having one carbonate group and one carboxyl group, a dicarbonate having two carbonate groups, and a polycarbonate having three or more carbonate groups. Among these compounds, the carbonate-ether, the carbonate-ester and the dicarbonate are preferable; and particularly preferable compounds are (2-ethoxyethyl)methyl carbonate, (2-ethoxyethyl)ethyl carbonate, (2-propoxyethyl)methyl carbonate, (2-benzyloxyethyl)phenyl carbonate, and 5-t-butyl-1,2-phenylenediphenyl dicarbonate.

The above internal electron-donating compound (c) is particularly preferably one or more compounds selected from the 1,3-diether compounds, the carbonate-ether compounds, and carboxylic acid diester compounds.

The solid catalyst component (A) is preferably a compound that is prepared by contacting the above magnesium compound (a), the above titanium halogen compound (b), the above internal electron-donating compound (c), and further, if necessary, polysiloxane, with each other, in the presence of an inert organic solvent.

The above polysiloxane is a polymer having a siloxane bond (—Si—O bond) in the main chain, and is also generically referred to as silicone oil; and means a chain, partially hydrogenated, cyclic or modified polysiloxane which is liquid or viscous at normal temperature and has a viscosity from 0.02 to 100.00 cm$^2$/s (2 to 1000 centistokes) at 25° C.

Examples of the chain polysiloxane include dimethylpolysiloxane and methylphenylpolysiloxane. Examples of the partially hydrogenated polysiloxane include methylhydrogen polysiloxane having a hydrogenation ratio of 10 to 80%. Examples of the cyclic polysiloxane include hexamethylcyclotrisiloxane, octamethylcyclotetrasiloxane, decamethylcyclopentasiloxane, 2,4,6-trimethylcyclotrisiloxane, and 2,4,6,8-tetramethylcyclotetrasiloxane. Examples of the modified polysiloxane include higher fatty acid group-substituted dimethylsiloxane, epoxy group-substituted dimethylsiloxane, and polyoxyalkylene group-substituted dimethylsiloxane. Among these compounds, decamethylcyclopentasiloxane and dimethylpolysiloxane is preferable, and the decamethylcyclopentasiloxane is particularly preferable.

By contacting with the polysiloxane, the stereoregularity or crystallinity of the obtained polymer can be easily improved, and further the fine powder in the obtained polymer can be easily decreased.

The above inert organic solvent is preferably a solvent which dissolves the titanium halogen compound (b) and does not dissolve the magnesium compound (a). Specific examples thereof include one or more compounds selected from: saturated hydrocarbon compounds such as pentane, hexane, heptane, octane, nonane, decane, cyclohexane, methylcyclohexane, ethylcyclohexane, 1,2-diethylcyclohexane, methylcyclohexene, decalin, and mineral oil; aromatic hydrocarbon compounds such as benzene, toluene, xylene, and ethylbenzene; and halogenated hydrocarbon compounds such as orthodichlorobenzene, methylene chloride, 1,2-dichlorobenzene, carbon tetrachloride, and dichloroethane.

The above inert organic solvent is preferably a saturated hydrocarbon compound or an aromatic hydrocarbon compound which is liquid at room temperature and has a boiling point of 50 to 300° C. Among these compounds, one or more compounds are preferable which are selected from hexane, heptane, octane, cyclohexane, ethylcyclohexane, decalin, mineral oil, toluene, xylene, and ethylbenzene.

Examples of a method for preparing the solid catalyst component (A) include a preparation method involving forming a suspension liquid by suspending the magnesium compound (a) and the internal electron-donating compound (c) in an inert organic solvent, and contacting a mixed solution formed from the titanium halogen compound (b) and an inert organic solvent, with the above suspension liquid, for reaction.

Examples of the method for preparing the solid catalyst component (A) also include a preparation method involving suspending the magnesium compound (a) in the titanium halogen compound (b) or the inert organic solvent, followed by contacting with the internal electron-donating compound (c) and further, if necessary, the titanium halogen compound (b), for reaction.

In the method for producing a catalyst for polymerization of an olefin according to the present invention, when the solid catalyst component (A) is prepared by contacting the components with each other, the preparation can be carried out in an inert gas atmosphere.

Specifically, the solid catalyst component (A) can be obtained by contacting the components with each other while stirring the components in a container equipped with a stirrer, in a condition in which moisture or the like is removed, under an inert gas atmosphere, and subsequently reacting the components at a predetermined temperature.

A temperature at which the components are contacted with each other may be in a relatively low temperature range around room temperature, in the case where the components are simply contacted with each other, then stirred and mixed, or in the case where the components are dispersed or suspended and subjected to denaturing treatment.

When a product is obtained by contacting the components with each other and then reacting the components, the temperature is preferably in a range of 40 to 130° C.; and in this case, the components are preferably held and reacted at the same temperature after being contacted with each other.

When the temperature at which the above product is obtained is lower than 40° C., the reaction does not proceed sufficiently, and as a result, it becomes difficult for the obtained solid catalyst component to exhibit sufficient performance. On the other hand, when the temperature exceeds 130° C., the solvent which has been used causes significant evaporation or the like, and it becomes difficult to control the reaction.

The reaction time for obtaining the above product is preferably 1 minute or longer, is more preferably 10 minutes or longer, and is further preferably 30 minutes or longer.

A ratio of the amount of each component to be used for the preparation of the solid catalyst component (A) varies depending on a preparation method, and accordingly, may be appropriately determined.

When the solid catalyst component (A) is prepared, preferably 0.50 to 100.00 mol, more preferably 0.50 to 10.00 mol, further preferably 1.00 to 5.00 mol of the titanium halogen compound (b) per 1.00 mol of the magnesium compound (a) is contacted.

In addition, when the catalyst component is prepared, preferably 0.01 to 10.00 mol, more preferably 0.01 to 1.00 mol, further preferably 0.02 to 0.6 mol of the internal electron-donating compound (c) per 1.00 mol of the magnesium compound (a) is contacted.

When polysiloxane is used in the preparation of the solid catalyst component (A), preferably 0.01 to 100.00 g, more preferably 0.05 to 80.00 g, further preferably 1.00 to 50.00 g of the polysiloxane per 1.00 mol of the magnesium compound (a) is contacted.

In addition, when an inert organic solvent such as an aromatic hydrocarbon compound is used in the preparation of the solid catalyst component (A), the amount to be used is preferably 0.001 to 500.000 mol, is more preferably 0.001 to 70.000 mol, and is further preferably 0.005 to 50.000 mol, per 1.000 mol of the magnesium compound (a).

In the method for producing a catalyst for polymerization of an olefin according to the present invention, the contents of the titanium atom, the magnesium atom, the halogen atom and the electron-donating compound which constitute the solid catalyst component (A) are not particularly determined within a range in which the effects of the present invention can be exhibited.

The solid catalyst component (A) preferably contains 1.0 to 10.0% by mass of titanium atoms, more preferably contains 1.5 to 8.0% by mass, and further preferably contains 1.5 to 5.0% by mass.

The solid catalyst component (A) preferably contains 10.0 to 70.0% by mass of magnesium atoms, more preferably contains 10.0 to 50.0% by mass, further preferably contains 15.0 to 40.0% by mass, and still further preferably contains 15.0 to 25.0% by mass.

The solid catalyst component (A) preferably contains 20.0 to 90.0% by mass of halogen atoms, more preferably contains 30.0 to 85.0% by mass, further preferably contains 40.0 to 80.0% by mass, and still further preferably contains 45.0 to 80.0% by mass.

The solid catalyst component (A) preferably contains 0.5 to 30.0% by mass, in total of the internal electron-donating compound (c), more preferably contains 1.0 to 25.0% by mass in total, and further preferably contains 2.0 to 20.0% by mass in total.

In the present application document, a percent content of titanium atoms which are contained in the solid catalyst component (A) and a percent content of magnesium atoms mean values that are each measured by a method (oxidation-reduction titration) described in JIS 8311-1997 "Method of quantifying titanium in titanium ore".

In the present application document, a content of halogen atoms contained in the solid catalyst component (A) of the present invention means a value that is measured by a silver nitrate titration method of treating the solid catalyst component with a mixed solution of sulfuric acid and pure water to form its aqueous solution, collecting a predetermined amount therefrom, and titrating the halogen atoms therein with a silver nitrate standard solution.

In addition, a content of the electron-donor compound means a value obtained by hydrolyzing the solid catalyst, extracting an internal electron donor with the use of an aromatic solvent, and measuring this solution by a gas chromatography FID (Flame Ionization Detector, hydrogen flame ionization detector) method.

Examples of particularly preferable methods for preparing the solid catalyst component (A) include the following preparation method.

Firstly, the magnesium compound (a) is suspended in an aromatic hydrocarbon compound (inactive organic solvent) having a boiling point of 50 to 150° C., and a suspension liquid is obtained. Subsequently, the obtained suspension liquid is contacted with the titanium halogen compound (b), and is subjected to reaction treatment.

Before or after the titanium halogen compound (b) is contacted with the above suspension liquid, one or more compounds selected from the internal electron-donating compound (c) are contacted with the resultant liquid at −20 to 130° C. The obtained liquid is further contacted with a polysiloxane, if necessary, for reaction treatment.

In the above preparation method, it is desirable to carry out an aging reaction at a low temperature before or after contacting of the electron-donating compound (c).

In the method for producing a catalyst for polymerization of an olefin according to the present invention, the solid catalyst component (A) and the organoaluminum compound (B) represented by the following general formula (I):

wherein $R^1$ represents an alkyl group having 1 to 6 carbon atoms, Q represents a hydrogen atom or a halogen atom, and p represents a real number satisfying $0 < p \leq 3$, are contacted with each other.

In the organoaluminum compound represented by the above general formula (I), $R^1$ represents an alkyl group having 1 to 6 carbon atoms, and may be any of linear and branched groups; includes a group selected from a methyl group, an ethyl group, a propyl group, an isopropyl group, a butyl group, an isobutyl group, a pentyl group, an isopentyl group, a hexyl group, and an isohexyl group; and is preferably an ethyl group or an isobutyl group.

In the organoaluminum compound represented by the above general formula (I), Q represents a hydrogen atom or a halogen atom; and is preferably a hydrogen atom, a chlorine atom or a bromine atom.

In the organoaluminum compound represented by the above general formula (I), p is a real number satisfying $0 < p \leq 3$; and is preferably a real number of 2 to 3, and is more preferably 2, 2.5 or 3.

Specific examples of such an organoaluminum compound (B) include triethyl aluminum, diethyl aluminum chloride, triisobutyl aluminum, diethyl aluminum bromide and diethyl aluminum hydride; and one compound or two or more compounds can be used. Among these compounds, triethyl aluminum or triisobutyl aluminum is preferable.

It is considered that in the method for producing a catalyst for polymerization of an olefin according to the present invention, when the specific organoaluminum compound (B) represented by the above general formula (I) is used, the organoaluminum compound (B) enhances its action onto the electron-donating compound that constitutes the solid catalyst component (A) and can optimally activate the solid catalyst component (A). In addition, even in the case where the catalyst for polymerization of an olefin has been prepared in an inert gas atmosphere in such a case that the solid catalyst component (A) is used which contains the internal electron-donating compound (c) other than the phthalic acid ester, it is considered that the catalyst shows excellent activity at the time of polymerization treatment, and can produce polymers of olefins excellent in stereoregularity.

In the method for producing a catalyst for polymerization of an olefin according to the present invention, at least one selected from the solid catalyst component (A) and the organoaluminum compound (B) is previously subjected to contact treatment with a hydrocarbon compound having one or more vinyl groups, in an organic solvent containing 30% by mass or more of one or more compounds selected from saturated aliphatic hydrocarbon compounds having 20 or more carbon atoms.

In other words, in the present application document, "previously being subjected to contact treatment with a hydrocarbon compound having one or more vinyl groups" means that before the solid catalyst component (A) and the organoaluminum compound (B) are contacted with each other, at least one of these is subjected to the contact treatment with the hydrocarbon compound having one or more vinyl groups.

In the method for producing a catalyst for polymerization of an olefin according to the present invention, an object to be previously subjected to contact treatment with the hydrocarbon compound having one or more vinyl groups may be the solid catalyst component (A), the organoaluminum compound (B), or both the solid catalyst component (A) and the organoaluminum compound (B).

In other words, in the present invention, examples of a mode in which the solid catalyst component (A) and the organoaluminum compound (B) are subjected to contact treatment with each other after any of the component and the compound is previously subjected to contact treatment with the hydrocarbon compound having one or more vinyl groups include the following three modes (1) to (3).

(1) The solid catalyst component (A) and a hydrocarbon compound having one or more vinyl groups are previously contacted with each other, and then the resulting preliminary contact product is contacted with the organoaluminum compound (B).

(2) The organoaluminum compound (B) and a hydrocarbon compound having one or more vinyl groups are previously contacted with each other, and then the resulting preliminary contact product is contacted with the solid catalyst component (A).

(3) The solid catalyst component (A) and a hydrocarbon compound having one or more vinyl groups are previously contacted with each other to obtain a preliminary contact product A, whereas the organoaluminum compound (B) and the hydrocarbon compound having one or more vinyl groups are previously contacted with each other to obtain a preliminary contact product B, and then the resulting preliminary contact product A and preliminary contact product B are contacted with each other.

In the method for producing a catalyst for polymerization of an olefin according to the present invention, the amount of the hydrocarbon compound having one or more vinyl groups to be previously contacted with at least one selected from the solid catalyst component (A) and the organoaluminum compound (B) is preferably 1 mol or more, per 1 mol of titanium constituting the solid catalyst component (A) which is subjected to the production of the catalyst for polymerization of an olefin; and is preferably 1 to 1,000,000 mol, is more preferably 10 to 100,000 mol, and is further preferably 100 to 50,000 mol.

For information, when both the solid catalyst component (A) and the organoaluminum compound (B) are previously subjected to contact treatment with the hydrocarbon compound having one or more vinyl groups, the above amount of contact means the respective amounts of contact at the time when the solid catalyst component (A) and the organoaluminum compound (B) are each subjected to contact treatment with the hydrocarbon compound having one or more vinyl groups.

The method for producing a catalyst for polymerization of an olefin according to the present invention controls the amount of the hydrocarbon compound having one or more vinyl groups to be previously contacted with at least one of the solid catalyst component (A) and the organoaluminum compound (B) so as to satisfy the above conditions, and thereby can cause a protective film of polyolefin easily formed on at least one surface of the solid catalyst component (A) and the organoaluminum compound (B).

In the method for producing a catalyst for polymerization of an olefin according to the present invention, the hydrocarbon compound having one or more vinyl groups is not particularly limited; but one or more compounds are preferable that are selected from ethylene, propylene, 1-butene, 1-pentene, 3-methyl-1-butene, 1-hexene, 4-methyl-1-pentene, 3-methyl-1-pentene, 1,4-hexadiene, 1,5-hexadiene, 1,6-octadiene, 1,7-octadiene, 1-heptene, 1-octene, vinylcyclohexane and vinylcyclohexene; and one or more compounds are more preferable which are selected from ethylene, propylene, 1-hexene, 3-methyl-1-pentene, 1,5-hexadiene, and 4-methyl-1-pentene.

The hydrocarbon compound having one or more vinyl groups to be brought into preliminary contact with the solid catalyst component (A) and the organoaluminum compound (B) may be the same compound as or a different compound from the olefins to be polymerized by the catalyst for polymerization of the olefins according to the present invention.

In the method for producing a catalyst for polymerization of an olefin according to the present invention, when at least one selected from the solid catalyst component (A) and the organoaluminum compound (B) and a hydrocarbon compound having one or more vinyl groups are previously contacted with each other, the contact treatment is performed in an organic solvent containing 30% by mass or more of one or more compounds selected from saturated aliphatic hydrocarbon compounds having 20 or more carbon atoms.

The organic solvent containing 30% by mass or more of one or more compounds selected from saturated aliphatic hydrocarbon compounds having 20 or more carbon atoms is preferably a compound which does not react with the solid catalyst component (A) or the organoaluminum compound (B), and has preferably fluidity in a temperature range of −5° C. to 100° C.; and specific examples thereof include one or more compounds selected from icosane, henicosane, tetracosane, a paraffin-containing liquid, and mineral oil.

For information, in the present application document, the above paraffin or mineral oil shall be treated as a compound containing only a saturated aliphatic hydrocarbon compound having 20 or more carbon atoms (in which content ratio of saturated aliphatic hydrocarbon compound having 20 or more carbon atoms is 100% by mass).

The organic solvent that is used in the method for producing a catalyst for polymerization of an olefin according to the present invention contains one or more compounds selected from saturated aliphatic hydrocarbon compounds having 20 or more carbon atoms in an amount of 30% by mass or more, preferably 50 to 100% by mass, and more preferably 80 to 100% by mass.

As the organic solvent containing 30% by mass or more of one or more compounds selected from saturated aliphatic hydrocarbon compounds having 20 or more carbon atoms, mineral oil is preferable.

In the present application document, the mineral oil is also referred to as paraffinum liquidum, lubricating oil, liquid paraffin or the like, and means a mixture of saturated hydrocarbon-based hydrocarbons, which contains a saturated aliphatic hydrocarbon compound having 20 or more carbon atoms as a main component, is obtained by distillation of petroleum, removal of solid paraffin and further purification, includes naphthene and isoparaffin, and is liquid at room temperature.

In the present application, the mineral oil having a wide viscosity range can be used; and the mineral oil can be used which has a molecular weight of 300 g/mol or larger, for example, and high viscosity.

For information, in the present application document, the content ratio of one or more compounds selected from the saturated aliphatic hydrocarbon compounds having 20 or more carbon atoms contained in the organic solvent means a value calculated from the purity of the compound selected as the organic solvent and from the mixing ratio.

In the method for producing a catalyst for polymerization of an olefin according to the present invention, a concentration of the hydrocarbon compound having one or more vinyl groups in the above organic solvent is preferably 0.0001 to 560 mol/kg, is more preferably 0.001 to 60 mol/kg, and is further preferably 0.01 to 6 mol/kg.

In the method for producing a catalyst for polymerization of an olefin according to the present invention, it is preferable that any one of the solid catalyst component (A) and the organoaluminum compound (B) is brought into preliminary contact with a hydrocarbon compound having one or more vinyl groups in the above organic solvent, and then the resultant compound is subjected to mutual contact treatment with the other compound.

In the method for producing a catalyst for polymerization of an olefin according to the present invention, a mode of preliminarily contacting the solid catalyst component (A) and the hydrocarbon compound having one or more vinyl groups with each other in the organic solvent, and then contacting the resultant component with the organoaluminum compound (B) includes, specifically, a mode of contacting a precursor composition (α) of the catalyst for polymerization of the olefin, containing: the solid catalyst component (A) containing magnesium, titanium, halogen and the internal electron-donating compound; the hydrocarbon compound having one or more vinyl groups; and an organic solvent containing 30% by mass or more of one or more compounds selected from saturated aliphatic hydrocarbon compounds having 20 or more carbon atoms, and the organoaluminum compound (B) represented by the following general formula (I):

$$R^1_p AlQ_{3-p} \quad (I),$$

wherein $R^1$ represents an alkyl group having 1 to 6 carbon atoms, Q represents a hydrogen atom or a halogen atom, and p represents a real number satisfying $0 < p \leq 3$, with each other.

A concentration of the solid catalyst component (A) in the above precursor composition (α) of the catalyst for polymerization of the olefin is preferably 0.001 to 50% by mass, is more preferably 0.001 to 30% by mass, and is further preferably 0.01 to 10% by mass.

In addition, in the method for producing a catalyst for polymerization of an olefin according to the present invention, a mode of preliminarily contacting the organoaluminum compound (B) and the hydrocarbon compound having one or more vinyl groups with each other in an organic solvent, and then contacting the resultant component with the solid catalyst component (A) includes, specifically, a mode of contacting the precursor composition (β) of the catalyst for polymerization of the olefin, containing: the organoaluminum compound (B) represented by the following formula (I):

$$R^1_p AlQ_{3-p} \quad (I),$$

wherein $R^1$ represents an alkyl group having 1 to 6 carbon atoms, Q represents a hydrogen atom or a halogen atom, and p represents a real number satisfying $0 < p \leq 3$; the hydrocarbon compound having one or more vinyl groups; and the organic solvent containing 30% by mass or more of one or more compounds selected from saturated aliphatic hydrocarbon compounds having 20 or more carbon atoms, and the solid catalyst component (A) containing magnesium, titanium, halogen and an internal electron-donating compound, with each other.

A concentration of the organoaluminum compound (B) in the above precursor composition (β) of the catalyst for polymerization of the olefin is preferably 1 to 80% by mass, is more preferably 3 to 50% by mass, and is further preferably 5 to 30% by mass.

Note that in the present invention, the order of contact of the components at the time of preparing the above precursor composition (α) of the catalyst for polymerization of the olefin or the above precursor composition (β) of the catalyst for polymerization of the olefin is not particularly limited, and examples thereof include the order of contact of any one of the following (1) to (3).

(1) An organic solvent containing 30% by mass or more of one or more compounds selected from saturated aliphatic hydrocarbon compounds having 20 or more carbon atoms is mixed with a hydrocarbon compound having one or more vinyl groups, and any one of the solid catalyst component (A) and the organoaluminum compound (B) is mixed with the obtained mixture.

(2) An organic solvent containing 30% by mass or more of one or more compounds selected from saturated aliphatic hydrocarbon compounds having 20 or more carbon atoms is mixed with any one of the solid catalyst component (A) and the organoaluminum compound (B), and a hydrocarbon compound having one or more vinyl groups is mixed with the obtained mixture.

(3) Any one of the solid catalyst component (A) and the organoaluminum compound (B) is simultaneously mixed with a hydrocarbon compound having one or more vinyl groups, and an organic solvent containing 30% by mass or more of one or more compounds selected from saturated aliphatic hydrocarbon compounds having 20 or more carbon atoms.

In the method for producing a catalyst for polymerization of an olefin according to the present invention, at least one selected from the solid catalyst component (A) and the organoaluminum compound (B) is previously subjected to contact treatment with a hydrocarbon compound having one or more vinyl groups in an organic solvent containing 30% by mass or more of one or more compounds selected from saturated aliphatic hydrocarbon compounds having 20 or more carbon atoms.

Due to the preliminary contact between at least one selected from the solid catalyst component (A) and the organoaluminum compound (B) and the hydrocarbon compound having one or more vinyl groups in a state of being dispersed in the specific organic solvent, the solid catalyst component (A) and the organoaluminum compound (B) can be conveniently conveyed to the site of use, in each a stable state.

In addition, as described above, when the solid catalyst component (A) and the organoaluminum compound (B) are conveyed to the site of use in each a stable state, and then, the catalyst for polymerization of an olefin is prepared by contacting the solid catalyst component (A) and the organoaluminum compound (B) with each other immediately before use, the obtained catalyst can effectively exhibit the polymerization activity for olefins over the whole period from immediately after the preparation to deactivation, and can economically perform the polymerization treatment.

Furthermore, due to the preliminary contact between at least one selected from the group consisting of the solid catalyst component (A) and the organoaluminum compound (B) and the hydrocarbon compound having one or more vinyl groups, in a state of being dispersed in the specific organic solvent, the preliminary contact treatment can be easily performed with the use of a general mixing device, without providing any special addition and a contact device.

In the method for producing a catalyst for polymerization of an olefin according to the present invention, when any one of the solid catalyst component (A) and the organoaluminum compound (B) is brought into preliminary contact with the hydrocarbon compound having one or more vinyl groups in the above organic solvent, the concentration of the hydrocarbon compound having a vinyl group in the organic solvent is preferably the same concentration as the concentration mentioned above.

In the method for producing a catalyst for polymerization of an olefin according to the present invention, a mode of previously contacting a hydrocarbon compound having one or more vinyl groups with at least one selected from the solid catalyst component (A) and the organoaluminum compound (B) is not particularly limited, but includes a method of mixing a predetermined amount of the solid catalyst component (A) or the organoaluminum compound (B) to be contacted, in a container which has accommodated a predetermined amount of the hydrocarbon compound having one or more vinyl groups therein.

When a hydrocarbon compound having one or more vinyl groups is previously contacted with both the solid catalyst component (A) and the organoaluminum compound (B), any of the solid catalyst component (A) and the organoaluminum compound (B) to be contacted may be mixed each in a predetermined amount, in a plurality of vessels each containing a predetermined amount of a hydrocarbon compound having one or more vinyl groups, respectively.

In the method for producing a catalyst for polymerization of an olefin according to the present invention, when the hydrocarbon compound having one or more vinyl groups is previously contacted with at least one of the solid catalyst component (A) and the organoaluminum compound (B), the contact time period is preferably 15 seconds or longer, is more preferably 1 to 300 minutes, and is further preferably 1 to 60 minutes.

In the method for producing a catalyst for polymerization of an olefin according to the present invention, when the hydrocarbon compound having one or more vinyl groups is previously contacted with at least one of the solid catalyst component (A) and the organoaluminum compound (B), the contact temperature is preferably 0 to 80° C., is more preferably 10 to 60° C., and is further preferably 20 to 50° C.

In the method for producing a catalyst for polymerization of an olefin according to the present invention, the solid catalyst component (A) or the organoaluminum compound (B) is usually subjected to the production of the catalyst for polymerization of an olefin, in a state of being in contact with the hydrocarbon compound having one or more vinyl groups (together with hydrocarbon compound having one or more vinyl groups).

When the hydrocarbon compound having one or more vinyl groups is liquid at room temperature, the solid catalyst component (A) or the organoaluminum compound (B) may be isolated from the hydrocarbon compound having one or more vinyl groups, and then subjected to the production of the catalyst for polymerization of an olefin.

As for the solid catalyst component (A) or the organoaluminum compound (B) which is previously subjected to the contact treatment with the hydrocarbon compound having one or more vinyl groups, it is preferable to subject the resultant component or compound to the reaction of the catalyst for polymerization of an olefin, before 24 hours elapse after the above contact treatment, and is more preferably to subject the resultant component or compound to the reaction of the catalyst for polymerization of an olefin, immediately after the above contact treatment.

In the method for producing a catalyst for polymerization of an olefin according to the present invention, it is considered that when the hydrocarbon compound having one or more vinyl groups is previously contacted with at least one selected from the solid catalyst component (A) and the organoaluminum compound (B), a protective film of polyolefin can be easily formed on a surface of at least one selected from the solid catalyst component (A) and the organoaluminum compound (B).

It is considered that as a result, an excessive activation reaction of the organoaluminum compound (B) to the titanium active site in the solid catalyst component (A) can be suppressed, and the catalyst for polymerization of an olefin can be subjected to the polymerization reaction in a stable state while suppressing the deactivation of the catalyst.

Because of this, according to the present invention, a decrease in polymerization activity due to early deactivation of the active site, after having been formed, can be suppressed, excellent catalyst activity at the time of polymerization of olefins can be exhibited, and polymers of the olefins excellent in stereoregularity can be easily produced, even in the case of using a solid catalyst component containing an internal electron-donating compound which does not have an aromatic ring structure directly bonded to a residue of a carboxylic acid ester, in place of an internal electron-donating compound having an aromatic ring structure directly bonded to the residue of the carboxylic acid ester.

In the method for producing a catalyst for polymerization of an olefin according to the present invention, contacting of the solid catalyst component (A) and the organoaluminum compound (B) with each other may be performed in the presence of the external electron-donating compound (C) or in the absence of the external electron-donating compound (C).

When the solid catalyst component (A) and the organoaluminum compound (B) are contacted with each other in the absence of the external electron-donating compound (C), it is preferable to contact the solid catalyst component (A) and the organoaluminum compound (B) with each other, and then to contact the contact-treated product obtained thereby with the external electron-donating compound (C).

In the method for producing a catalyst for polymerization of an olefin according to the present invention, examples of the external electron-donating compound (C) include the same compound as the aforementioned internal electron-donating compound (c) constituting the solid catalyst component (A), and organosilicon compounds. Among the compounds, preferable compounds are compounds having one or more groups selected from a carbonate group, an ether group and an ester group, and one or more compounds selected from organosilicon compounds.

When the external electron-donating compound is a compound having a carbonate group, preferable compounds are one or more compounds selected from 2-ethoxyethylphenyl carbonate, 2-benzyloxyethylphenyl carbonate, and 2-ethoxyethyl-1-methyl carbonate.

When the external electron-donating compound is a compound having an ether group, 1,3 diether is preferable, and particularly preferable compounds are one or more compounds selected from 9,9-bis(methoxymethyl)fluorene, and 2-isopropyl-2-isopentyl-1,3-dimethoxypropane.

When the external electron-donating compound is a compound having an ester group, preferable compounds are one or more compounds selected from methyl benzoate and ethyl benzoate.

When the external electron-donating compound is an organosilicon compound, preferable compounds are one or more compounds selected from organosilicon compounds containing a Si—O—C bond and organosilicon compounds containing a Si—N—C bond.

Examples of the above organosilicon compound include compounds represented by the following general formula (III):

$$R^3{}_r Si(NR^4R^5)_s(OR^6)_{4-(r+s)} \quad (III),$$

wherein r is an integer of 0≤r≤4, s is an integer of 0≤s≤4, and r+s is an integer of 0≤r+s≤4; $R^3$, $R^4$ and $R^5$ are one compound selected from a hydrogen atom, a linear alkyl group having 1 to 12 carbon atoms, a branched alkyl group having 3 to 12 carbon atoms, a vinyl group, an allyl group, a substituted or unsubstituted cycloalkyl group, a phenyl group and an aralkyl group; $R^3$, $R^4$ and $R^5$ may contain a heteroatom; $R^3$, $R^4$ and $R^5$ may be the same as or different from each other; $R^4$ and $R^5$ may be bonded to each other to form a ring shape; $R^6$ is one group selected from an alkyl group having 1 to 4 carbon atoms, a vinyl group, an allyl group, a cycloalkyl group having 3 to 12 carbon atoms, a phenyl group having 6 to 12 carbon atoms, and an aralkyl group; and $R^6$ may contain a heteroatom.

In the above general formula (III), $R^3$ is preferably a linear alkyl group having 1 to 10 carbon atoms, a branched alkyl group having 3 to 10 carbon atoms, or a cycloalkyl group having 5 to 8 carbon atoms; and is particularly preferably a linear alkyl group having 1 to 8 carbon atoms, a branched alkyl group having 3 to 8 carbon atoms, and the cycloalkyl group having 5 to 8 carbon atoms.

In the above general formula (III), $R^4$ and $R^5$ are each preferably a linear alkyl group having 1 to 10 carbon atoms, a branched alkyl group having 3 to 10 carbon atoms, or a cycloalkyl group having 5 to 8 carbon atoms; and are each particularly preferably a linear alkyl group having 1 to 8 carbon atoms, a branched alkyl group having 3 to 8 carbon atoms, or a cycloalkyl group having 5 to 7 carbon atoms. Note that $R^4$ and $R^5$ may be combined to form a ring shape, and in this case, the group forming the ring shape ($NR^4R^5$) includes a perhydroquinolino group and a perhydroisoquinolino group.

In the above general formula (III), $R^6$ is any one selected from an alkyl group having 1 to 4 carbon atoms, a cycloalkyl group, a phenyl group, a vinyl group, an allyl group and an aralkyl group; and is preferably a linear alkyl group having 1 to 6 carbon atoms or a branched alkyl group having 3 to 6 carbon atoms; and is particularly preferably a linear alkyl group having 1 to 4 carbon atoms or a branched alkyl group having 3 to 4 carbon atoms.

Examples of the external electron-donating compounds represented by the above general formula (III) include one or more compounds selected from phenylalkoxysilane, alkylalkoxysilane, phenylalkylalkoxysilane, cycloalkylalkoxysilane, cycloalkyl(alkyl)alkoxysilane, (alkylamino)alkoxysilane, alkyl(alkylamino)alkoxysilane, alkyl(alkylamino) silane, alkylaminosilane, and the like.

Among these compounds, compounds which are preferably used are one or more compounds selected from phenyltrimethoxysilane, t-butylmethyldimethoxysilane, t-butylethyldimethoxysilane, diisopropyldimethoxysilane, isopropylisobutyldimethoxysilane, diisopentyldimethoxysilane, diphenyldimethoxysilane, dicyclopentyldimethoxysilane, cyclohexylmethyldimethoxysilane, tetramethoxysilane, tetraethoxysilane, t-butylmethylbis(ethylamino)silane, bis(ethylamino)dicyclohexylsilane, dicyclopentylbis(ethylamino)silane, bis(perhydroquinolino)dimethoxysilane, bis(perhydroisoquinolino)dimethoxysilane, and diethylaminotriethoxysilane.

One or two or more compounds can be combined and used as the above external electron-donating compound (C).

In the method for producing a catalyst for polymerization of an olefin according to the present invention, the amount of the above organoaluminum compound (B) to be contacted at the time of forming the above catalyst for polymerization is preferably 0.1 to 1000.0 mol, is more preferably 1.0 to 800.0 mol, and is further preferably 20.0 to 600.0 mol, per 1.0 mol of titanium atoms in the above solid catalyst component (A).

In the method for producing a catalyst for polymerization of an olefin according to the present invention, in the case where the external electron-donating compound (C) is used when the above catalyst for polymerization is formed, the amount of the external electron-donating compound (C) to be contacted is preferably 0.005 to 1.000 mol, is more preferably 0.080 to 0.500 mol, and is further preferably 0.010 to 0.300 mol, per 1 mol of the organoaluminum compound (B) represented by the general formula (I).

In the method for producing a catalyst for polymerization of an olefin according to the present invention, a concentration of the inert gas in the atmosphere at the time of preparing the above catalyst for polymerization is preferably 0.0 to 1.0 mol/L, is more preferably 0.0 to 0.5 mol/L, and is further preferably 0.0 to 0.1 mol/L.

Examples of the above inert gas include one or more compounds selected from nitrogen gas, helium gas, neon gas, and argon gas.

In the method for producing a catalyst for polymerization of an olefin according to the present invention, the above catalyst for polymerization may be produced in the presence of olefins to be polymerized, or in the absence of the olefins to be polymerized.

In the method for producing a catalyst for polymerization of an olefin according to the present invention, a temperature at which the solid catalyst component (A) and the organoaluminum compound (B) are contacted with each other at the time of preparation of the above catalyst for polymerization is preferably 40° C. or lower, is more preferably 0° C. to 40° C., is further preferably 10° C. to 40° C., and is particularly further preferably 10° C. to 20° C.

In the method for producing a catalyst for polymerization of an olefin according to the present invention, a treatment period of time at the time when the solid catalyst component (A) and the organoaluminum compound (B) are subjected to the contact treatment is preferably 10 seconds to 60 minutes, is more preferably 30 seconds to 30 minutes, is further preferably 1 minute to 30 minutes, and is particularly preferably 1 minute to 10 minutes.

In the preparation of the above catalyst for polymerization, when the solid catalyst component (A), the organoaluminum compound (B), and further, if necessary, the external electron-donating compound (C) are contacted with each other, the reaction is instantly started, and a target catalyst for polymerization of the olefin can be formed.

Usually, when an organoaluminum compound which is a cocatalyst, and further if necessary, an external electron-donating compound are contacted with a solid catalyst component, the reaction rapidly proceeds, the internal electron-donating compound constituting the solid catalyst component is desorbed and is exchanged with the external electron-donating compound, and the solid catalyst component is activated by the organoaluminum compound which is the cocatalyst; and in particular, in an inert gas atmosphere, deactivation of the active sites of the catalyst (active site on titanium) tends to easily occur due to the excessive reaction.

In the method for producing a catalyst for polymerization of an olefin according to the present invention, at least one selected from the solid catalyst component (A) containing the internal electron-donating compound and the organoaluminum compound (B) is previously subjected to contact treatment with a hydrocarbon compound having one or more vinyl groups, and thereby, a protective film of polyolefin becomes to be easily formed on the surface of the solid catalyst component. It is considered that as a result, the catalyst for polymerization of an olefin suppresses an excessive activation reaction onto the active site of titanium in the solid catalyst component, by the organoaluminum compound, and can be subjected to the polymerization reaction in a stable state while suppressing deactivation of the catalyst.

For this reason, the present invention can provide a method for producing a catalyst for polymerization of an olefin, which suppresses a decrease in polymerization activity due to early deactivation of the active site after the catalyst has been formed, exhibits excellent catalyst activity at the time of polymerization of olefins, and can produce polymers of olefins, which are excellent in stereoregularity.

In the production method according to the present invention, the target catalyst for polymerization of an olefin can be prepared by the above contact treatment.

<Catalyst for Polymerization of Olefins>

A catalyst for polymerization of an olefin according to the present invention includes: a solid catalyst component (A) containing magnesium, titanium, halogen and an internal electron-donating compound; an organoaluminum compound (B) represented by the following general formula (I):

$$R^1_p AlQ_{3-p} \quad (I)$$

wherein $R^1$ represents an alkyl group having 1 to 6 carbon atoms, Q represents a hydrogen atom or a halogen atom, and p represents a real number satisfying $0<p\leq3$;

a hydrocarbon compound having one or more vinyl groups; and an organic solvent containing 30% by mass or more of one or more compounds selected from one or more compounds selected from saturated aliphatic hydrocarbon compounds having 20 or more carbon atoms, wherein the hydrocarbon compound having one or more vinyl groups is contained in an amount of at least 0.1% by mass with respect to the total weight of titanium contained in the solid catalyst component (A).

In the catalyst for polymerization of an olefin according to the present invention, a content of the hydrocarbon compound having one or more vinyl groups is specified by the following expression (α); and is at least 0.1% by mass (0.1% by mass or more), is preferably 0.1 to 800.0% by mass, is more preferably 0.5 to 775.0% by mass, and is further preferably 0.8 to 750.0% by mass, with respect to the total weight of titanium contained in the solid catalyst component (A) (when the amount of titanium contained in the solid catalyst component (A) is regarded as 100% by mass).

Content ratio (% by mass) of hydrocarbon compound having one or more vinyl groups=[content (% by mass) of hydrocarbon compound having one or more vinyl groups/total content ratio (% by mass) of titanium contained in solid catalyst component (A)]×100     (α)

For information, in the present application document, the content of the hydrocarbon compound having one or more vinyl groups in the catalyst for polymerization of an olefin means a value obtained by the following expression, on the basis of a weight w of a solid, which is obtained by weighing about 1 g of the catalyst for polymerization of the olefin, from which the solvent component has been removed in advance, hydrolyzing the catalyst in a mixed solution of 5 mL of 10% hydrochloric acid and 45 mL of anhydrous ethanol, for 15 minutes, and then recovering a solid (hydrocarbon compound having vinyl group) with the use of a filter paper (Whatman 2V Filter) which has been weighed in advance, rinsing the solid with distilled water to remove the hydrochloric acid component, air drying the resultant solid until the weight reaches a constant amount, and then weighing the resultant solid.

Content (% by mass) of hydrocarbon compound having one or more vinyl groups=(solid weight w (g)/(olefin polymerization catalyst weight (g)−solid weight w (g)))×100

In the catalyst for polymerization of an olefin according to the present invention, the details of the solid catalyst component (A), the organoaluminum compound (B) and the hydrocarbon compound having one or more vinyl groups are the same as those mentioned above.

The catalyst for polymerization of an olefin according to the present invention includes an organic solvent containing 30% by mass or more of one or more compounds selected from one or more compounds selected from saturated aliphatic hydrocarbon compounds having 20 or more carbon atoms, and is preferably a catalyst in a state of being dispersed in such an organic solvent.

Specific examples of the organic solvent containing 30% by mass or more of one or more compounds selected from saturated aliphatic hydrocarbon compounds having 20 or more carbon atoms include the same organic solvents as those mentioned above.

The catalyst for polymerization of an olefin according to the present invention can be suitably produced by the aforementioned method for producing a catalyst for polymerization of an olefin according to the present invention.

For this reason, the present invention can provide a catalyst for polymerization of an olefin, which suppresses a decrease in polymerization activity due to early deactivation of the active site after the catalyst has been formed, exhibits excellent catalyst activity at the time of polymerization of olefins, and can produce polymers of olefins, which are excellent in stereoregularity.

<Method for Polymerizing Olefins>

When an olefin is polymerized with the use of the catalyst for polymerization, which has been obtained by the production method according to the present invention, or the catalyst for polymerization according to the present invention, the above catalyst for polymerization after having been prepared can be subjected to polymerization treatment, by being isolated and contacted with the olefin, or by being contacted with the olefin in as-is state (without being isolated).

The polymerization of olefins may be homopolymerization, copolymerization, random copolymerization or block copolymerization of olefins.

Examples of the olefins to be polymerized include one or more compounds selected from ethylene, propylene, 1-butene, 1-pentene, 4-methyl-1-pentene, vinylcyclohexane, 1-hexene, 1,5-hexadiene, and the like. Among these compounds, ethylene, propylene, 4-methyl-1-pentene, 1-hexene and 1,5-hexadiene are preferable, and ethylene and propylene are particularly preferable.

When olefins are copolymerized, for example, when propylene and an olefin other than propylene are copolymerized, examples of the olefin to be copolymerized with propylene include one or more compounds selected from ethylene, 1-butene, 1-pentene, 4-methyl-1-pentene, vinylcyclohexane and the like, and ethylene and 1-butene are preferable.

When propylene and another olefin are copolymerized, examples of the method include: random copolymerization of polymerizing propylene and a small amount of ethylene which is a comonomer, in one stage; and so-called propylene-ethylene block copolymerization of homopolymerizing propylene in a first stage (first polymerization tank) and copolymerizing propylene and ethylene in a second stage (second polymerization tank) or in a plurality of stages (multistage polymerization tank).

A polymerization temperature of the olefins is preferably room temperature or higher and 200° C. or lower, and is more preferably room temperature or higher and 100° C. or lower. Note that the room temperature described here means 20° C.

The polymerization pressure of the olefins is preferably 10 MPa or lower, and is more preferably 6 MPa or lower.

The olefins may be polymerized by a continuous polymerization method or a batch polymerization method.

Furthermore, the polymerization reaction may be performed in one stage, or may be performed in multiple stages of two or more stages.

When the above olefins are subjected to a polymerization reaction, an atmosphere of the polymerization may be any one of an inert gas atmosphere or an atmosphere of gas of olefins to be polymerized such as the above propylene.

The catalyst for polymerization obtained by the production method according to the present invention or the catalyst for polymerization according to the present invention suppresses a decrease in polymerization activity due to early deactivation of the active site after the catalyst has been formed, exhibits excellent catalyst activity at the time of polymerization of olefins, and can easily produce polymers of olefins, which are excellent in stereoregularity.

Production Example 1

<Preparation of Solid Catalyst Component>

The inside of a round bottom flask which has a volume of 500 mL and is equipped with a stirrer was thoroughly purged with nitrogen gas, and then, the above round bottom flask was charged with 20 g of diethoxy magnesium, 60 mL of toluene, and 0.45 mL (1.8 mmol) of 2-isopropyl-2-isopentyl-1,3-dimethoxypropane (IIDMP); and a suspension liquid containing diethoxy magnesium was obtained.

Subsequently, the inside of a round bottom flask which has a volume of 500 mL and is equipped with a stirrer was thoroughly purged with nitrogen gas, and then, the above round bottom flask was charged with 50 mL of toluene and 40 mL of titanium tetrachloride: and a mixed solution of these compounds were obtained. Subsequently, the above diethoxy magnesium-containing liquid was added to the mixed solution of toluene and titanium tetrachloride, and a suspension liquid was prepared.

Subsequently, the obtained suspension liquid was subjected to a reaction at −6° C. for 30 minutes, and at 10° C. after being heated, for 30 minutes; then 2.9 mL (18.1 mmol) of 2-ethoxyethyl-1-ethyl carbonate (EEECA) and 0.9 mL (3.6 mmol) of 2-isopropyl-2-isopentyl-1,3-dimethoxypropane (IIDMP) were added thereto as the internal electron-donating compound; and the obtained suspension liquid was heated to 100° C., and subjected to a reaction for 1.5 hours while having been stirred.

After completion of the reaction, the supernatant was extracted from the above suspension liquid, and a precipitate was obtained; and the precipitate was cleaned four times with 150 mL of toluene at 90° C., and a reaction product was obtained. To the obtained reaction product, 20 mL of titanium tetrachloride and 100 mL of toluene were added; and the mixture was heated to 100° C. and reacted for 15 minutes, and a reaction product was obtained. Such treatment was carried out four times, and then, the above reaction product was cleaned with 150 mL of n-heptane at 40° C. six times; and the resultant product was subjected to solid-liquid separation, and a solid catalyst component (A1) was obtained.

The content of a titanium atom in the obtained solid catalyst component (A1) was measured, and as a result, was 2.1% by mass.

For information, the content of the titanium atom in the solid catalyst component (A1) was measured in accordance with a method (redox titration) described in JIS 8311-1997 "Method for determination of titanium in titanium ores" (the same applies to the following Production Examples).

Example 1

<Formation of Catalyst for Polymerization>

An atmosphere inside an autoclave having an inner volume of 2.0 liters with a stirrer was thoroughly purged with nitrogen; the autoclave was charged with 0.9 mmol of triethyl aluminum (organic aluminum compound (B)), 0.09 mmol of cyclohexylmethyldimethoxysilane (CMDMS) (external electron-donating compound (C)), and 8.7 g (10 mL) (corresponding to 4.5 mmol of propylene) of mineral oil which was mixed with propylene (Kaydol, produced by Sonneborn LLC); and then was charged with the solid catalyst component (A1) in an amount of 0.0018 mmol in terms of titanium atom (having been contacted with 2500 moles of propylene per one mol of titanium constituting the solid catalyst component (A1)). The internal temperature of the above autoclave was kept at 20° C. for 5 minutes, and a catalyst for polymerization was prepared.

<Production of Polypropylene>

The above autoclave with the stirrer, which contained the prepared catalyst for polymerization, was charged with 12 mol of liquefied propylene and 67 mmol of hydrogen gas. The mixture was subjected to preliminary polymerization at 20° C. for 5 minutes, and then after the temperature was raised, was subjected to the polymerization reaction at 70° C. for 60 minutes; and thereby, a propylene homopolymer was obtained.

The polymerization activity (g-PP/(g-cat·hour)) at the time of the formation of the obtained propylene homopolymer was calculated by the following expression (iv). The result is shown in Table 1.

Propylene homopolymerization activity (g-PP/(g-cat·time))=Amount of obtained PP (g)/(Mass (g)·one hour of solid catalyst component contained in catalyst for polymerization of olefin)) (iv)

<Rate of Rise in Polymerization Activity>

In comparison with the polymerization activity in the case where the catalyst for polymerization was formed under a nitrogen atmosphere and under the condition of no additive (no addition of hydrocarbon compound having one or more vinyl groups) (Comparative Example 1), the rate (%) of rise in the polymerization activity was calculated according to the following expression (v). The result is shown in Table 1.

Rate of rise in polymerization activity (%)=(polymerization activity (with additive)/polymerization activity (no additive))×100 (v)

Note that also in each of the following Examples, the polymerization activity (with additive) was determined, and the rate of rise in the polymerization activity was calculated in the same way as in the above, on the basis of the polymerization activity (no additive) of Comparative Example 1 in which the catalyst for polymerization was formed in the nitrogen atmosphere.

<Ratio of p-Xylene Solubles (XS) in Polymer>

A ratio of the p-xylene solubles (XS) of the obtained propylene homopolymer (homoPP) was determined by the following method.

A flask equipped with a stirring apparatus was charged with 4.0 g of the polymer (polypropylene) and 200 ml of p-xylene, and the outside temperature was set to the boiling point or higher (approximately 150° C.) of xylene; and thereby the temperature of p-xylene inside the flask was kept at the boiling point (137 to 138° C.) and in the meantime, the polymer was dissolved over 2 hours. After that, the liquid temperature was cooled to 23° C. over 1 hour, and an insoluble component and a soluble component were separated by filtration. A solution of the above soluble component was collected, p-xylene was distilled off by heating and drying under reduced pressure. The weight of the obtained residue was determined, and a relative ratio (% by mass) to the formed polymer (polypropylene) was calculated, and was determined to be xylene solubles (XS).

Example 2

A catalyst for polymerization was formed in the same way as in Example 1 except that 8.7 g (10 mL) (corresponding to 1.8 mmol of 1-hexene) of mineral oil mixed with 1-hexene (Kaydol, produced by Sonneborn LLC) was used in place of mineral oil mixed with propylene, and a propylene homopolymer was produced and evaluated in the same way as in Example 1. The results are shown in Table 1.

Note that in Example 2, the contacting was performed at 1000 mol of 1-hexene per 1 mol of titanium which constitutes the solid catalyst component (A1).

Example 3

A catalyst for polymerization was formed in the same way as in Example 1 except that 8.7 g (10 mL) (0.90 mmol of 1,5-hexadiene) of mineral oil mixed with 1,5-hexadiene (Kaydol, produced by Sonneborn LLC) was used in place of mineral oil mixed with propylene, and a propylene homopolymer was produced and evaluated in the same way as in Example 1. The results are shown in Table 1.

Note that in Example 3, the contacting was performed at 500 mol of 1,5-hexadiene per 1 mol of titanium which constitutes the solid catalyst component (A1).

Example 4

A catalyst for polymerization was formed in the same way as in Example 1 except that 8.7 g (10 mL) (1.8 mmol of 4-methyl-1-pentene) of mineral oil mixed with 4-methyl-1-pentene (Kaydol, produced by Sonneborn LLC) was used in place of mineral oil mixed with propylene, and a propylene homopolymer was produced and evaluated in the same way as in Example 1. The results are shown in Table 1.

Note that in Example 4, the contacting was performed at 1000 mol of 4-methyl-1-pentene per 1 mol of titanium which constitutes the solid catalyst component (A1).

Comparative Example 1

A catalyst for polymerization was formed in the same way as in Example 1 except that 8.7 g (10 mL) of mineral oil was charged into an autoclave at the time when the catalyst for polymerization was formed, in place of mineral oil mixed with propylene, and a propylene homopolymer was produced and evaluated in the same way as in Example 1. The results are shown in Table 1.

Example 5

A propylene homopolymer was produced in the same way as in Example 1, except that the catalyst for polymerization was prepared by thoroughly purging atmosphere inside an autoclave having an inner volume of 2.0 liters with a stirrer, with nitrogen, charging 0.9 mmol of triethyl aluminum (organic aluminum compound (B)), 0.09 mmol of cyclohexylmethyldimethoxysilane (CMDMS) (external electron-donating compound (C)), into the autoclave, then further charging a preliminary contact product in which the solid catalyst component (A1) in an amount of 0.0018 mmol in terms of titanium atom was previously added to 8.7 g (10 mL) (corresponding to 4.5 mmol of propylene) of mineral oil mixed with propylene (Kaydol, produced by Sonneborn LLC) (having been contacted with 2500 moles of propylene per one mol of titanium constituting the solid catalyst component (A1)), and keeping the internal temperature of the above autoclave at 20° C. for 5 minutes; and was evaluated in the same way as in Example 1. The results are shown in Table 1.

Example 6

A catalyst for polymerization was formed in the same way as in Example 5, except that 8.7 g (10 mL) (corresponding to 1.8 mmol of 1-hexene) of mineral oil mixed with 1-hexene (Kaydol, produced by Sonneborn LLC) was used in place of mineral oil mixed with propylene, and a propylene homopolymer was produced and evaluated in the same way as in Example 1. Note that in Example 6, the contacting was performed at 1000 mol of 1-hexene per 1 mol of titanium which constitutes the solid catalyst component (A1).

Example 7

A catalyst for polymerization was formed in the same way as in Example 5 except that 8.7 g (10 mL) (0.90 mmol of 1,5-hexadiene) of mineral oil mixed with 1,5-hexadiene (Kaydol, produced by Sonneborn LLC) was used in place of mineral oil mixed with propylene, and a propylene homopolymer was produced and evaluated in the same way as in Example 1. The results are shown in Table 1. Note that in Example 7, the contacting was performed at 500 mol of 1,5-hexadiene per 1 mol of titanium which constitutes the solid catalyst component (A1).

Example 8

A catalyst for polymerization was formed in the same way as in Example 5 except that 8.7 g (10 mL) (1.8 mmol of 4-methyl-1-pentene) of mineral oil mixed with 4-methyl-1-pentene (Kaydol, produced by Sonneborn LLC) was used in place of mineral oil mixed with propylene, and a propylene homopolymer was produced and evaluated in the same way as in Example 1. The results are shown in Table 1. Note that in Example 8, the contacting was performed at 1000 mol of 4-methyl-1-pentene per 1 mol of titanium which constitutes the solid catalyst component (A1).

Example 9

A propylene homopolymer was produced in the same way as in Example 1, except that the catalyst for polymerization was prepared by thoroughly purging an atmosphere inside an autoclave having an inner volume of 2.0 liters with a stirrer, with nitrogen, charging 0.9 mmol of triethyl aluminum (organic aluminum compound (B)), 0.09 mmol of cyclohexylmethyldimethoxysilane (CMDMS) (external electron-donating compound (C)), and 4.4 g (5 mL) (corresponding to 4.5 mmol of propylene) of mineral oil mixed with propylene (Kaydol, produced by Sonneborn LLC) into the autoclave, then further charging a preliminary contact product in which the solid catalyst component (A1) in an amount of 0.0018 mmol in terms of titanium atom was previously added to 4.4 g (5 mL) (corresponding to 4.5 mmol of propylene) of mineral oil mixed with propylene (Kaydol, produced by Sonneborn LLC) (having been contacted with 2500 moles of propylene per one mol of titanium constituting the solid catalyst component (A1)), and keeping the internal temperature of the above autoclave at 20° C. for 5 minutes; and was evaluated in the same way as in Example 1. The results are shown in Table 1.

Example 10

A propylene homopolymer was produced in the same way as in Example 1, except that the catalyst for polymerization was prepared by thoroughly purging an atmosphere inside an autoclave having an inner volume of 2.0 liters with a stirrer, with nitrogen, charging 0.9 mmol of triethyl aluminum (organic aluminum compound (B)), 0.09 mmol of cyclohexylmethyldimethoxysilane (CMDMS) (external electron-donating compound (C)), and 8.7 g (10 mL) (corresponding to 0.9 mmol of 1-hexene) of mineral oil mixed with 1-hexene (Kaydol, produced by Sonneborn LLC) into the autoclave, then charging a preliminary contact product in which the solid catalyst component (A1) in an amount of 0.0018 mmol in terms of titanium atom was previously added to 8.7 g (10 mL) (corresponding to 0.9 mmol of 1-hexene) of mineral oil mixed with 1-hexene (Kaydol, produced by Sonneborn LLC) (having been contacted with 1000 moles of 1-hexene per one mol of titanium constituting the solid catalyst component (A1)), and keeping the internal temperature of the above autoclave at 20° C. for 5 minutes; and was evaluated in the same way as in Example 1. The results are shown in Table 1.

Example 11

A propylene homopolymer was produced in the same way as in Example 1, except that the catalyst for polymerization was prepared by thoroughly purging an atmosphere inside an autoclave having an inner volume of 2.0 liters with a stirrer, with nitrogen, charging 0.9 mmol of triethyl aluminum (organic aluminum compound (B)), 0.09 mmol of cyclohexylmethyldimethoxysilane (CMDMS) (external electron-donating compound (C)), and 8.7 g (10 mL) (corresponding to 0.45 mmol of 1,5-hexadiene) of mineral oil mixed with 1,5-hexadiene (Kaydol, produced by Sonneborn LLC) into the autoclave, then charging a preliminary contact product in which the solid catalyst component (A1) in an amount of 0.0018 mmol in terms of titanium atom was previously added to 8.7 g (10 mL) (corresponding to 0.45 mmol of 1,5-hexadiene) of mineral oil mixed with 1,5-hexadiene (Kaydol, produced by Sonneborn LLC) (having been contacted with 500 moles of 1,5-hexadiene per one mol of titanium constituting the solid catalyst component (A1)), and keeping the internal temperature of the above autoclave at 20° C. for 5 minutes; and was evaluated in the same way as in Example 1. The results are shown in Table 1.

Example 12

A propylene homopolymer was produced in the same way as in Example 1, except that the catalyst for polymerization was prepared by thoroughly purging atmosphere inside an autoclave having an inner volume of 2.0 liters with a stirrer, with nitrogen, charging 0.9 mmol of triethyl aluminum (organic aluminum compound (B)), 0.09 mmol of cyclohexylmethyldimethoxysilane (CMDMS) (external electron-donating compound (C)), and 8.7 g (10 mL) (corresponding to 0.9 mmol of 4-methyl-1-pentene) of mineral oil mixed with 4-methyl-1-pentene (Kaydol, produced by Sonneborn LLC) into the autoclave, then charging a preliminary contact product in which the solid catalyst component (A1) in an amount of 0.0018 mmol in terms of titanium atom was previously added to 8.7 g (10 mL) (corresponding to 0.9 mmol of 4-methyl-1-pentene) of mineral oil mixed with 4-methyl-1-pentene (Kaydol, produced by Sonneborn LLC) (having been contacted with 1000 moles of 4-methyl-1-pentene per one mol of titanium constituting the solid catalyst component (A1)), and keeping the internal temperature of the above autoclave at 20° C. for 5 minutes; and was evaluated in the same way as in Example 1. The results are shown in Table 1.

TABLE 1

|  | Hydrocarbon compound having one or more vinyl groups | Polymerization activity [g-PP/(g-cat · hour)] | Rate of rise in polymerization activity [%] | XS of homo PP [% by mass] |
|---|---|---|---|---|
| Example 1 | Propylene | 39,100 | 137.7 | 1.3 |
| Example 2 | 1-hexene | 35,800 | 126.1 | 1.5 |
| Example 3 | 1,5-hexadiene | 41,500 | 146.1 | 1.5 |
| Example 4 | 4-methyl-1-pentene | 37,000 | 130.3 | 1.5 |
| Comparative Example 1 | None | 28,400 | 100 | 2.0 |
| Example 5 | Propylene | 40,100 | 141.2 | 1.2 |
| Example 6 | 1-hexene | 36,500 | 128.5 | 1.6 |
| Example 7 | 1,5-hexadiene | 41,700 | 146.8 | 1.4 |

TABLE 1-continued

| | Hydrocarbon compound having one or more vinyl groups | Polymerization activity [g-PP/(g-cat · hour]] | Rate of rise in polymerization activity [%] | XS of homo PP [% by mass] |
|---|---|---|---|---|
| Example 8 | 4-methyl-1-pentene | 36,600 | 128.9 | 1.4 |
| Example 9 | Propylene | 39,500 | 139.1 | 1.3 |
| Example 10 | 1-hexene | 37,200 | 131.0 | 1.6 |
| Example 11 | 1,5-hexadiene | 43,500 | 153.2 | 1.3 |
| Example 12 | 4-methyl-1-pentene | 37,900 | 133.5 | 1.5 |

From the results of Table 1, it is understood that in the catalysts for polymerization of an olefin obtained in Examples 1 to 12, at least one selected from the solid catalyst component (A) and the specific organoaluminum compound (B) is previously subjected to the contact treatment with the hydrocarbon compound having one or more vinyl groups in the specific organic solvent, and accordingly that the catalysts after having been formed exhibits excellent activity at the time of the polymerization of the olefin, by suppressing the decrease in polymerization activity due to early deactivation of the active site, to an equal level or higher, and can each produce polymers of olefins, which are excellent in stereoregularity.

On the other hand, from the results of Table 1, it is understood that in the catalyst for polymerization of an olefin obtained in Comparative Example 1, any of the solid catalyst component (A) and the specific organoaluminum compound (B) is not previously subjected to the contact treatment with a hydrocarbon compound having one or more vinyl groups in a specific organic solvent, and accordingly that the deactivation of the active sites of the catalyst proceeds due to an excessive reaction by the organoaluminum compound, the catalyst cannot exhibit the desired activity, and the obtained polymer shows high XS and is inferior in the stereoregularity.

INDUSTRIAL APPLICABILITY

According to the present invention, it is possible to provide: a method for producing a catalyst for polymerization of an olefin, which suppresses a decrease in polymerization activity due to early deactivation of the active site after the catalyst has been formed, exhibits excellent activity at the time of polymerization of olefins, and can produce polymers of olefins, which are excellent in stereoregularity; and the catalyst for polymerization of the olefin.

The invention claimed is:

1. A method for producing a catalyst for polymerization of an olefin, comprising contacting a solid catalyst component (A) containing magnesium, titanium, halogen and an internal electron-donating compound, and an organoaluminum compound (B) represented by the following general formula (I):

$$R^1_p AlQ_{3-p} \quad (I),$$

wherein $R^1$ represents an alkyl group having 1 to 6 carbon atoms, Q represents a hydrogen atom or a halogen atom, and p represents a real number satisfying $0 < p \le 3$, with each other, wherein at least one selected from the solid catalyst component (A) and the organoaluminum compound (B) is previously subjected to contact treatment with a hydrocarbon compound having one or more vinyl groups, in an organic solvent containing 30% by mass or more of one or more compounds selected from saturated aliphatic hydrocarbon compounds having 20 or more carbon atoms.

2. The method for producing a catalyst for polymerization of an olefin according to claim 1, wherein the solid catalyst component (A) is previously subjected to the contact treatment with the hydrocarbon compound having one or more vinyl groups, in the organic solvent containing 30% by mass or more of one or more compounds selected from saturated aliphatic hydrocarbon compounds having 20 or more carbon atoms.

3. The method for producing a catalyst for polymerization of an olefin according to claim 2, comprising contacting a precursor composition (α) of the catalyst for polymerization of an olefin, the precursor composition (α) containing: the solid catalyst component (A) containing magnesium, titanium, halogen and the internal electron-donating compound; a hydrocarbon compound having one or more vinyl groups; and an organic solvent containing 30% by mass or more of one or more compounds selected from saturated aliphatic hydrocarbon compounds having 20 or more carbon atoms, and the organoaluminum compound (B) represented by the following general formula (I):

$$R^1_p AlQ_{3-p} \quad (I),$$

wherein $R^1$ represents an alkyl group having 1 to 6 carbon atoms, Q represents a hydrogen atom or a halogen atom, and p represents a real number satisfying $0 < p \le 3$, with each other.

4. The method for producing a catalyst for polymerization of an olefin according to claim 1, wherein the organoaluminum compound (B) is previously subjected to the contact treatment with the hydrocarbon compound having one or more vinyl groups, in the organic solvent containing 30% by mass or more of one or more compounds selected from saturated aliphatic hydrocarbon compounds having 20 or more carbon atoms.

5. The method for producing a catalyst for polymerization of an olefin according to claim 4, comprising contacting a precursor composition (β) of the catalyst for polymerization of an olefin, the precursor composition (β) containing: the organoaluminum compound (B) represented by the following general formula (I):

$$R^1_p AlQ_{3-p} \quad (I),$$

wherein $R^1$ represents an alkyl group having 1 to 6 carbon atoms, Q represents a hydrogen atom or a halogen atom, and p represents a real number satisfying $0 < p \le 3$; a hydrocarbon compound having one or more vinyl groups; and an organic solvent containing 30% by mass or more of one or more compounds selected from saturated aliphatic hydrocarbon compounds having 20 or more carbon atoms, and the solid catalyst component (A) containing magnesium, titanium, halogen and an internal electron-donating compound, with each other.

6. The method for producing a catalyst for polymerization of an olefin according to claim 1, wherein the amount of at least one selected from the solid catalyst component (A) and the organoaluminum compound (B) to be previously subjected to the contact treatment with the hydrocarbon compound having one or more vinyl groups is 1 mol or more per 1 mol of titanium constituting the solid catalyst component (A) that is subjected to production of the catalyst for polymerization of an olefin.

7. The method for producing a catalyst for polymerization of an olefin according to claim 1, wherein the hydrocarbon compound having one or more vinyl groups is one or more compounds selected from ethylene, propylene, 1-butene, 1-pentene, 3-methyl-1-butene, 1-hexene, 4-methyl-1-pentene, 3-methyl-1-pentene, 1,4-hexadiene, 1,5-hexadiene, 1,6-octadiene, 1,7-octadiene, 1-heptene, 1-octene, vinylcyclohexane, and vinylcyclohexene.

8. The method for producing a catalyst for polymerization of an olefin according to claim 1, wherein the organic solvent is a mineral oil.

9. A catalyst for polymerization of an olefin comprising:

a solid catalyst component (A) containing magnesium, titanium, halogen and an internal electron-donating compound; an organoaluminum compound (B) represented by the following general formula (I):

$$R^1_p AlQ_{3-p} \quad (I),$$

wherein $R^1$ represents an alkyl group having 1 to 6 carbon atoms, Q represents a hydrogen atom or a halogen atom, and p represents a real number satisfying $0<p\leq3$;

a hydrocarbon compound having one or more vinyl groups; and an organic solvent containing 30% by mass or more of one or more compounds selected from saturated aliphatic hydrocarbon compounds having 20 or more carbon atoms, wherein the hydrocarbon compound having one or more vinyl groups is contained in an amount of at least 0.1% by mass with respect to a total weight of titanium contained in the solid catalyst component (A).

10. The catalyst for polymerization of an olefin according to claim 9, wherein the hydrocarbon compound having one or more vinyl groups is one or more compounds selected from ethylene, propylene, 1-butene, 1-pentene, 3-methyl-1-butene, 1-hexene, 4-methyl-1-pentene, 3-methyl-1-pentene, 1,4-hexadiene, 1,5-hexadiene, 1,6-octadiene, 1,7-octadiene, 1-heptene, 1-octene, vinylcyclohexane, and vinylcyclohexene.

11. The catalyst for polymerization of an olefin according to claim 9, wherein the organic solvent is a mineral oil.

* * * * *